United States Patent
Shah (10) Patent No.: US 7,684,450 B2
(45) Date of Patent: Mar. 23, 2010

(54) PULSED LASER SOURCE WITH ADJUSTABLE GRATING COMPRESSOR

(75) Inventor: Lawrence Shah, Ypsilanti, MI (US)

(73) Assignee: IMRA America, Inc., Ann Arbor, MI (US)

( * ) Notice: Subject to any disclaimer, the term of this patent is extended or adjusted under 35 U.S.C. 154(b) by 264 days.

(21) Appl. No.: 11/314,197

(22) Filed: Dec. 20, 2005

(65) Prior Publication Data

US 2006/0159137 A1   Jul. 20, 2006

Related U.S. Application Data

(60) Provisional application No. 60/638,072, filed on Dec. 20, 2004.

(51) Int. Cl.
H01S 3/10 (2006.01)

(52) U.S. Cl. .................. 372/25; 372/20; 372/29.01; 372/29.02; 372/30

(58) Field of Classification Search ............ 372/14, 372/15, 16, 22, 25, 26–28, 20, 29.01, 29.02, 372/30

See application file for complete search history.

(56) References Cited

U.S. PATENT DOCUMENTS

| | | | |
|---|---|---|---|
| 5,329,398 A * | 7/1994 | Lai et al. ................. | 359/566 |
| 5,499,134 A | 3/1996 | Galvanauskas | |
| 5,896,484 A | 4/1999 | Borrelli et al. | |
| 5,978,538 A | 11/1999 | Miura et al. | |
| 5,982,963 A | 11/1999 | Feng | |
| 6,272,156 B1 | 8/2001 | Reed et al. | |
| 6,552,301 B2 | 4/2003 | Herman | |
| 6,573,026 B1 | 6/2003 | Aitken et al. | |
| 7,106,496 B2 | 9/2006 | Kurimura | |
| 7,424,185 B2 | 9/2008 | Glebov | |

(Continued)

FOREIGN PATENT DOCUMENTS

DE    101 24 983 A 1     3/2002

(Continued)

OTHER PUBLICATIONS

Osellame et al., "Femtosecond writing of active optical waveguides with astigmatically shaped beams," J. Opt. Soc. Am. B. , 2003, vol. 20, No. 7, pp. 1559-1567.

(Continued)

Primary Examiner—Minsun Harvey
Assistant Examiner—Xnning Niu
(74) Attorney, Agent, or Firm—Knobbe Martens Olson & Bear LLP (57) ABSTRACT

Various embodiments described herein relate to a laser source for producing a pulsed laser beam comprising a plurality of ultrashort optical pulses having a variable repetition rate. In one embodiment, the laser source comprises a fiber oscillator, which outputs optical pulses and a pulse stretcher disposed to receive the optical pulses. The optical pulses have an optical pulse width. The pulse stretcher has dispersion that increases the optical pulse width yielding stretched optical pulses. The laser source further comprises a fiber amplifier disposed to receive the stretched optical pulses. The fiber optical amplifier has gain so as to amplify the stretched optical pulses. The laser source includes an automatically adjustable grating compressor having dispersion that reduces the optical pulse width. The grating compressor automatically adjusts this dispersion for different repetition rates.

8 Claims, 5 Drawing Sheets

U.S. PATENT DOCUMENTS

| | | | |
|---|---|---|---|
| 2001/0048788 A1* | 12/2001 | Xie et al. ...................... 385/37 |
| 2002/0076655 A1 | 6/2002 | Borrelli et al. |
| 2002/0159740 A1 | 10/2002 | Beall et al. |
| 2003/0035640 A1 | 2/2003 | Dugan et al. |
| 2003/0099452 A1 | 5/2003 | Borrelli et al. |
| 2003/0110810 A1 | 6/2003 | Dunn et al. |
| 2003/0156605 A1* | 8/2003 | Richardson et al. ........... 372/25 |
| 2003/0189756 A1* | 10/2003 | Erbert et al. ................ 359/572 |
| 2003/0189959 A1 | 10/2003 | Erbert |
| 2003/0215204 A1 | 11/2003 | Schroeder |
| 2004/0047578 A1 | 3/2004 | Fukuda et al. |
| 2004/0226925 A1 | 11/2004 | Gu |
| 2005/0041702 A1* | 2/2005 | Fermann et al. ............... 372/25 |
| 2006/0285561 A1 | 12/2006 | Shah |
| 2007/0273960 A1 | 11/2007 | Fermann |

FOREIGN PATENT DOCUMENTS

| | | |
|---|---|---|
| DE | 10222491 | 11/2003 |
| JP | 2002-502061 A | 1/2002 |
| WO | WO 95/20178 A1 | 7/1995 |
| WO | WO 01/09899 | 2/2001 |
| WO | WO 03/046625 | 6/2003 |
| WO | WO 2004/013668 | 2/2004 |

OTHER PUBLICATIONS

Osellame et al., "Optical waveguide writing with a diode-pumped femtosecond oscillator," Opt. Lett., 2004, vol. 29, No. 16, pp. 1900-1902.

Streltsov et al., "Study of femtosecond-laser-written waveguides in glasses," J. Opt. Soc. Am. B, 2002, vol. 19, No. 10, pp. 2496-2504.

Taccheo et al., "Er:Yb-doped waveguide laser fabricated by femtosecond laser pulses," Opt. Lett., 2004, vol. 29, No. 22, pp. 2626-2628.

Will et al., "Generation of photoinduced waveguides using a high repetition rate fiber CPA system," CLEO 2003 CWI6.

Fukuda et al., "Improvement on asymmetry of low-loss waveguides written in pure silica glass by femtosecond laser pulses," Optical Fibers and Passive Components, 2004, eds. Shen, et al., Proc. SPIE, vol. 5279, pp. 21-28.

Galvanauskas et al.: High energy femtosecond pulse compressin in chirped fiber gratings, A.Galvanauskas, D.Harter, S.Radic, G.Agrawal, Conf. Lasers and Electro-Optics, 1996. CLEO 1996 pp. 499-500.

Loh et al.: 10 Gb/s transmission over 700 km of standard single-mode fiber with 10-cm chirped fiber grating compensator and duobinary transmitter, W.H. Loh; R.I. Laming; A.D. Ellis; D. Atkinson Photonics Tech Letters vol. 8 Issue: 9 Date: Sep. 1996 pp. 1258-1260.

Yusuke Nasu et al. "Low-loss waveguides written with a femtosecond laser for flexible interconnection in a planar light-wave circuit," Optics Letters, vol. 30, No. 7, pp. 723-725, Apr. 1, 2005.

Chris B. Schaeffer et al. "Laser-induced breakdown and damage in bulk transparent materials induced by tightly focused femtosecond laser pulses," Meas. Sci. and Tech., vol. 12, pp. 1784-1794, Oct. 9, 2001.

L. Shah et al., "Waveguide writing in fused silica with a femtosecond fiber laser at 522 nm and 1 MHz repetition rate", Optics Express, vol. 13, No. 6, pp. 1999-2006, Mar. 21, 2005.

Extended European Search Report dated Oct. 2, 2009 for EP Appl. No. 05858657.9 in 7 pages.

* cited by examiner

PULSED LASER SOURCE WITH ADJUSTABLE GRATING COMPRESSOR

PRIORITY APPLICATION

This application claims priority to U.S. patent application Ser. No. 60/638,072 filed Dec. 20, 2004, entitled "OPTICAL WAVEGUIDE WRITING UTILIZING VISIBLE FEMTOSECOND PULSES," which is hereby incorporated by reference herein in its entirety.

BACKGROUND

1. Field of the Invention

The apparatus and methods relate to pulsed lasers and to fabricating waveguides with pulsed lasers.

2. Description of the Related Art

As is well known, waveguides comprise optical pathways for propagating light within a medium such as, for example, within a slab. The waveguide may be fabricated by modifying a refractive index of a material in the medium. Examples of waveguides include channel waveguides that may be disposed at a surface of or buried within a substrate. Integrated optics with complicated 3-D architectures may be formed with such waveguides structures.

Waveguides may be fabricated by shining light into the medium to alter the physical state of the material and to modify the refractive index in the material. Waveguide writing may be accomplished by using lasers and, in particular, pulsed lasers. Unfortunately, waveguide writing is a complex process. The process may not be feasible for many waveguide materials using commercially available laser systems. Accordingly, additional apparatus and methods are needed that enable waveguide writing with laser light.

SUMMARY

Various embodiments described herein include a laser source for producing a pulsed laser beam comprising a plurality of ultrashort optical pulses having a variable repetition rate. In one embodiment, the laser source comprises a fiber oscillator, which outputs optical pulses and a pulse stretcher disposed to receive the optical pulses. The optical pulses have an optical pulse width. The pulse stretcher has dispersion that increases the optical pulse width yielding stretched optical pulses. The laser source further comprises a fiber amplifier disposed to receive the stretched optical pulses. The fiber optical amplifier has gain so as to amplify the stretched optical pulses. The laser source includes an automatically adjustable grating compressor having dispersion that reduces the optical pulse width. The dispersion of the grating compressor is adjustable. The grating compressor automatically adjusts the dispersion for different repetition rates.

Another embodiment of the invention also comprises a laser source that produces a pulsed laser beam comprising a plurality of ultrashort optical pulses having a variable repetition rate. The laser source comprises a fiber oscillator that outputs optical pulses having an optical pulse width and an automatically adjustable grating compressor having dispersion that reduces the optical pulse width. The dispersion is adjustable, and the grating compressor automatically adjusts the dispersion for different repetition rates.

Another embodiment comprises a method of producing a pulsed laser beam comprising a plurality of ultrashort optical pulses having a variable repetition rate. The method comprises producing optical pulses having an optical pulse width, reducing the optical pulse width to provide compressed optical pulses, and varying the repetition rate. In this method, the dispersion of a compressor is automatically adjusted for the different repetition rates so as to produce the minimum pulse width.

Another embodiment described herein comprises a method of fabricating a waveguide in a medium. This method comprises producing an ultrafast pulsed laser beam comprising optical pulses having a pulse width between about 300 and 700 femtoseconds in duration and a wavelength in the range between about 490 and 550 nanometers. This method further comprises directing at least a portion of the ultrafast pulsed laser beam into a region of the medium and removing the ultrafast pulsed laser beam from the region of the medium. The ultrafast pulsed laser beam directed into the region has sufficient intensity to alter the index of refraction of the medium in the region after the ultrafast pulse laser beam is removed so that the waveguide is formed in the medium. In one embodiment of this method, the ultrafast pulsed laser beam has a laser fluence on the region of the medium of between about 5 J/cm$^2$ and 50 J/cm$^2$. In another embodiment, the optical pulses have a repetition rate between about 100 kHz to 5 MHz.

Another embodiment of this method of fabricating a waveguide further comprises producing infrared light and frequency doubling the infrared light to produce the visible light beam.

In another embodiment of this method of fabricating a waveguide, the medium is selected from the group of materials consisting of substantially transparent crystal, glass, and polymer. In another embodiment, the medium comprises fused silica. In yet another embodiment, the medium comprises a material having a material ionization bandgap $\lambda_g$ and the wavelength is between $3.0\,\lambda_g$ and $5\,\lambda_g$.

In another embodiment, this method further comprises translating the medium to form elongated waveguides.

In yet another embodiment, this method further comprises moving the ultrafast pulsed laser beam to form elongated waveguides.

Another embodiment disclosed herein comprises a system for fabricating a waveguide in a medium. This system comprises an infrared fiber laser, a frequency doubler, and a translation system. The infrared fiber laser outputs an ultrafast pulsed infrared laser beam. The frequency doubler receives the ultrafast pulsed infrared laser beam and outputs an ultrafast pulsed visible laser beam having a wavelength in the range between about 490 and 550 nanometers. The ultrafast pulsed visible laser beam comprises optical pulses having a pulse width of between about 300 and 700 femtoseconds in duration. The ultrafast pulsed visible laser beam illuminates a spatial region of the medium. The translation system alters the spatial region to form the waveguide in the medium.

In one embodiment of this system, the infrared fiber laser comprises a Yb-doped fiber laser. In yet another embodiment, the infrared fiber laser outputs a wavelength between 1030 and 1050 nanometer and the frequency doubler comprises a nonlinear optical element that produces light with a wavelength between 515 and 525 nanometers through second harmonic generation.

In another embodiment of this system for fabricating a waveguide, the ultrafast pulsed visible laser beam has a laser fluence on the spatial region of between about 5 J/cm$^2$ and 50 J/cm$^2$. In yet another embodiment, the optical pulses have a variable repetition rate from about 100 kHz to 5 MHz.

Another embodiment of this system for fabricating a waveguide further comprises optics disposed to receive the ultrafast visible pulsed laser beam and illuminate the spatial region therewith. In one embodiment of this system, the optics comprises a microscope objective. In another embodiment of the system, the optics has a numerical aperture of less than about 1.0.

In one embodiment of this system for fabricating a waveguide, the translation system comprises a translation stage on which the medium is disposed. In yet another embodiment, the translation system comprises a movable mirror.

Also disclosed herein is a system for fabricating a waveguide that comprises an ultrafast pulsed laser light source that produces an ultrafast pulsed visible laser beam. The ultrafast pulsed visible laser beam comprises optical pulses having a pulse duration between about 300 to about 800 femtoseconds and a wavelength between about 490 and 550 nanometers. This system further comprises a medium positioned in the beam. The medium has a physical structure and an index of refraction that depends on the structure such that the structure is altered by the beam of visible light to thereby alter the index of refraction.

In an embodiment of this system for fabricating a waveguide, the medium has a material ionization bandgap $\lambda_g$ and the wavelength is between 3.0 $\lambda_g$ and 5 $\lambda_g$. In another embodiment, the medium is selected from the group of materials consisting of transparent crystal, glass, and polymer, while in yet another embodiment, the medium comprises fused silica.

Also disclosed herein is a method of fabricating a waveguide in a medium comprises producing a visible light beam and directing the visible light beam into a region of the medium to alter a physical state of the medium in the region and change the refractive index in the region thereby forming a waveguide.

In one embodiment of this method of fabricating a waveguide, the light source has an output wavelength between 3.0 $\lambda_g$ and 5 $\lambda_g$, where $\lambda_g$ is the material ionization bandgap. In another embodiment, the visible light beam comprises green light. In still another embodiment, the visible light beam has a wavelength in the range between about 490 and 550 nanometers for waveguide writing in fused silica.

Still another embodiment disclosed herein comprises a method of fabricating a waveguide in a medium. This method comprises producing a visible light beam, directing at least a portion of the visible light beam into a region of the medium, and removing the visible light beam from the region of the medium. The visible light beam directed into the region has sufficient intensity to alter the index of refraction of the medium in the region after the visible light beam is removed to form the waveguide in the medium.

In one embodiment of this method of fabricating a waveguide, the light source has an output wavelength between 3.0 $\lambda_g$ and 5 $\lambda_g$ where $\lambda_g$ is the material ionization bandgap. In another embodiment of this method, the visible light beam comprises green light. In yet another embodiment, the visible light beam has a wavelength in the range between about 490 and 500 nanometers for waveguide writing in fused silica.

Another embodiment of this method of fabricating a waveguide further comprises producing infrared light and frequency doubling the infrared light to produce the visible light beam. In another embodiment of this method, the frequency doubling comprises second harmonic generation. In another embodiment, the infrared light comprises laser light of about 1040 nanometers and the visible light beam comprises laser light of about 520 nanometers. In yet another embodiment, the method further comprises pulsing the infrared laser at a variable repetition rate from about 100 kHz to 5 MHz. In still another embodiment, the infrared laser includes a compressor grating and a translator that is automatically repositioned to provide optimal pulse compression with changes in the repetition rate.

An embodiment of this method of fabricating a waveguide further comprises pulsing the visible light beam to produce pulses between about 300 and 700 femtoseconds in duration. In another embodiment of this method, the medium is selected from the group of materials consisting of substantially transparent crystal, glass, and polymer. In yet another embodiment of this method, the medium comprises fused silica.

An additional embodiment of this method of fabricating a waveguide further comprises translating the medium to form elongated waveguides. Another embodiment of this method further comprises moving the visible light beam to form elongated waveguides. In yet another embodiment of this method, the index of refraction in the medium is increased after removal of the visible light.

Another embodiment disclosed herein comprises a system for fabricating a waveguide. This system comprises a light source that produces a beam of visible light and a medium positioned in the beam. The medium has a physical structure and an index of refraction that depends on the structure. The structure is altered by the beam of visible light such that the index of refraction is altered.

In one embodiment of this system, the light source has an output wavelength between 3.0 $\lambda_g$ and 5 $\lambda_g$, where $\lambda_g$ is the material ionization bandgap. In another embodiment of this system, the light source has an output wavelength between about 490 and 500 nanometers for waveguide writing in fused silica. In yet another embodiment, the light source comprises a laser. In still another embodiment, the medium is selected from the group of materials consisting of substantially transparent crystal, glass, and polymer. In an embodiment of this system, the medium comprises fused silica.

Another embodiment disclosed herein also comprises a system for fabricating a waveguide in a medium. This system comprises a visible laser light source that outputs a visible light and illuminates a spatial region of the medium with the visible light and a translation system for translating the spatial region to form the waveguide in the medium.

In one embodiment of this system for fabricating a waveguide, the visible laser light source comprises an infrared laser and a frequency doubler. In another embodiment, the infrared laser comprises a Yb-doped fiber laser. In yet another embodiment, the infrared laser comprises a 1045 nanometer wavelength laser and the frequency doubler comprises a nonlinear optical element that produces 522.5 nanometer wavelength light through second harmonic generation. In still another embodiment, the visible laser light source has an output wavelength between about 490 and 500 nanometers. For example, the infrared fiber laser may output a wavelength between 1030 and 1050 nanometer and the frequency doubler comprises a nonlinear optical element may produce light with a wavelength between 515 and 525 nanometers through second harmonic generation. In a further embodiment, the visible laser light source has a variable repetition rate from about 100 kHz to 5 MHz.

In another embodiment of this system for fabricating a waveguide, the infrared laser includes a compressor grating and a mechanism by which the dispersion of compressor grating is automatically adjusted to provide optimal pulse compression with changes in the repetition rate.

Another embodiment of this system further comprises optics disposed to receive the visible light output from the visible laser light source and illuminate the spatial region with the visible light. In one embodiment, the optics comprises a microscope objective. In another embodiment, the optics has a numerical aperture of less than about 1.0.

In another embodiment of this system of fabricating a waveguide, the translation system comprises a translation stage on which the medium is disposed. In another embodiment of this system, the translation system comprises a movable mirror.

DETAILED DESCRIPTION OF CERTAIN PREFERRED EMBODIMENTS

Figure 1:
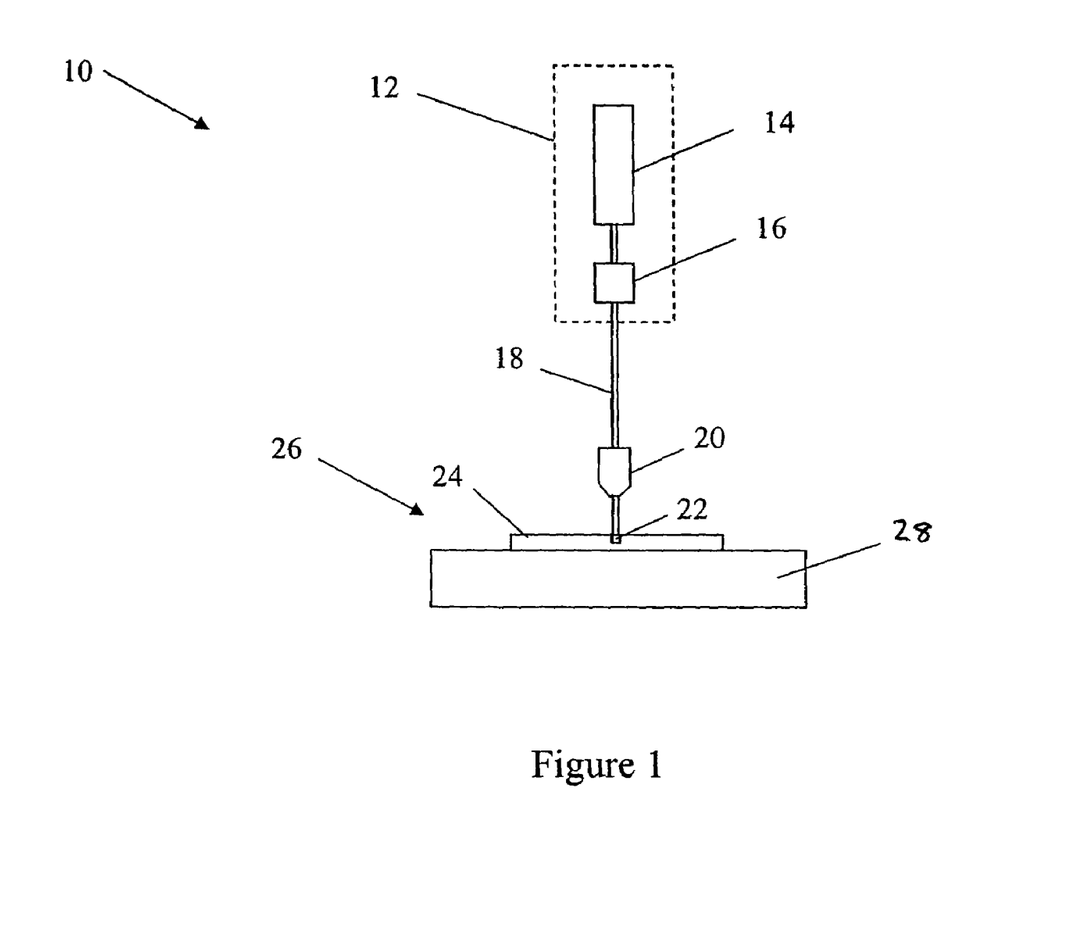
FIG. 1 shows an embodiment of a system for writing a waveguide in a medium, which comprises a visible laser light source, focusing optics, and a translation system that supports the medium.

A system 10 capable of writing a waveguide in a medium comprising fused silica is illustrated in FIG. 1. This system 10 comprises a visible laser light source 12 that outputs visible light. The visible laser light source 12 has an output wavelength in the green region of the visible optical spectrum, e.g., between about 490 and 500 nanometers. This wavelength range may also be between about 450 and 700 nanometers in some embodiments.

The visible laser light source 12 comprises a Yb-doped fiber laser 14 that outputs light having a wavelength of approximately 1045 nanometers. An exemplary Yb-doped, amplified fiber laser 14 comprises the FCPA µJewel available from IMRA America, Ann Arbor Mich. This fiber laser has a pulse repetition rate between about 100 kHz and 5 MHz and is capable of outputting ultrashort pulses having pulse durations between about 300 fs and 700 fs. The high repetition rate allows the fabrication of low-loss waveguides at relatively high translation speeds (~1 mm/s). Values outside these ranges may also be possible in other embodiments.

The visible laser light source 12 further comprises a frequency doubler 16 that receives the optical pulses from the Yb-doped fiber laser. One preferred embodiment of the frequency doubler 16 utilizes non-critically phase matched lithium triborate (LBO) as the nonlinear media as this can maximize conversion efficiency and output beam quality. The frequency doubler may also comprise nonlinear media such as beta-barium borate (BBO), potassium titanyl phosphate (KTP), bismuth triborate $BiB_3O_6$, potassium dihydrogen phosphate (KDP), potassium dideuterium phosphate (KD*P), potassium niobate ($KNbO_3$), lithium niobate ($LiNbO_3$) and may include appropriate optics to focusing the incident beam into the nonlinear medium, to increase conversion efficiency, and collimate the second harmonic output beam. In some embodiments, the frequency doubler produces a frequency doubled output at a wavelength of about 522 nm through second harmonic generation. This output from the frequency doubler 16 and from the visible laser light source 12 is shown as a beam 18 in FIG. 1.

Other types of light sources and specifically other types of visible laser light sources 12 may be employed. Other types of lasers may be employed. For example, other types of fiber and non-fiber pulsed lasers may be employed. Frequency doubling and second harmonic generation may or may not be employed in different embodiments.

The system 12 further includes optics 20 disposed to receive visible light output from the visible laser light source 12. The optics 20 may include, for example, a microscope objective that focuses the beam 18 into a target region 22. (Note that the drawing in FIG. 1 is schematic and does not show the convergence of the beam although optics that focuses the beam may be employed.)

The optics 20 may have a numerical aperture (NA) less than about 1.0 and between about 1.0 and 0.4 in some embodiments. The low NA focusing objective facilitates the fabrication of three-dimensional waveguide patterns due to the longer depth of focus relative, e.g., to oil- and water-immersed objectives with NA>1.0. The visible wavelength near about 520 nm is also more compatible with standard high magnification objectives used in visible microscopy than near infrared (NIR) wavelengths. As such, the insertion loss and beam aberration introduced by the objective is significantly reduced. Other types of optics 20 may be employed and the optics may be excluded in certain embodiments.

The system 10 directs the laser beam onto a medium 24 and, in particular, into the target region 22 in or on the medium to form the waveguide. This medium 24 may comprise fused silica in some embodiments. The medium 24 may also comprise glass or polymer as well as crystal. Examples of material that may be employed include fluorine-doped silica glass and high bandgap crystalline materials such as quartz, sapphire, calcium fluoride, magnesium fluoride, barium fluoride, and beta barium borate. Other material may be used.

The system 10 further comprises a translation system 26 for moving the target region 22. The medium 24 may, for example, be mounted on a translation stage 28 that is translated or otherwise moved with respect to the laser beam 18. In other embodiments, the laser beam 18 may be translated, for example, using a mirror that can be rotated or tilted. The laser beam 18 may be translated or moved by moving other optical elements, for example, by shifting the microscope lens 20. Other configurations and arrangements for moving the beam 18 with respect to the medium 24 or otherwise moving the target region 22 may be employed.

The visible light incident on the medium 24 alters the index of refraction of the medium 24. In various preferred embodiments, illumination of the target region 22 with the visible laser light alters the physical state of the medium 24 and increases the index of refraction in the target region 22. The index of refraction is changed or increased in comparison with surrounding portions of the medium 24 not illuminated with the visible laser light. Because the physical state of the medium 24 is altered, the laser beam 18 can be removed and the change or increase in refractive index remains. A number of mechanisms may be possible for causing the index to be changed with illumination using the visible light.

Systems 10 such as described above offer many advantageous technical features. Use of frequency doubled 1045-nanometer radiation, for example, provides numerous benefits. For instance, while waveguides written in fused silica with the fundamental wavelength of a Yb-doped fiber laser (1045 nm) result in high optical losses, waveguides written under similar conditions with the second harmonic of the same laser (522 nm) produce very low optical losses.

The shorter wavelength also allows for tighter focusing due to the reduction in the diffraction limited spot size. Achieving high focal intensity/fluence with relatively low incident pulse energy is therefore possible.

Shorter wavelength should also enhance the multiphoton absorption process relative the longer wavelengths. Shorter wavelengths produce lower-order multi-photon ionization, leading to a wider separation between non-linear absorption states. This increases the separation between the thresholds for refractive index modification or damage allowing for a larger processing window. Interestingly, however, in other experiments ultrashort pulse, 400-nm laser irradiation is not successful in writing waveguides.

Also, since substantially many objectives have been designed for biological microscopy, the performance of these microscope objectives (such as optical transmission and aberration correction) is improved or optimized for visible wavelengths. Accordingly, by using the second harmonic of the Yb-based laser, the wavelength allows for simple integration into existing microscopic systems. Waveguide writing can therefore be integrated in parallel together with a rudimentary inspection system.

Waveguide writing is a complex and challenging process. As referred to above, techniques that may be well-suited for one class of materials may be inappropriate for another class. Accordingly, identifying this regime wherein waveguide writing is possible, appears to provide benefits such as, for example, lower optical losses, use of smaller spot sizes and higher focal intensity/fluences, and improved integration into existing microscope systems, etc., that might not otherwise available.

Figure 2:
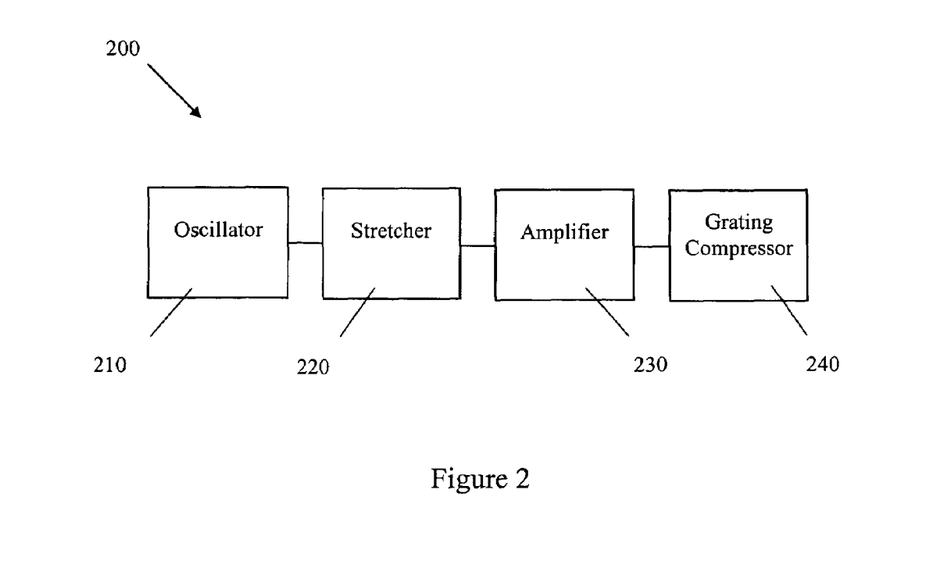
FIG. 2 shows a schematic diagram of an embodiment of a visible laser light source that comprises an oscillator, a pulse stretcher, an optical amplifier, and a grating compressor.

In one preferred embodiment, a laser source 200 such as schematically shown in FIG. 2 comprises, for example, a modified FCPA μJewel from IMRA America. Additional details regarding a variety of laser sources 200 are disclosed in U.S. patent application Ser. No. 10/992,762 entitled "All-Fiber Chirped Pulse Amplification Systems" (IM-114), filed Nov. 22, 2004, and U.S. Pat. No. 6,885,683 entitled "Modular, High Energy, Widely-tunable Ultrafast Fiber Source," issued Apr. 26, 2005, both of which are incorporated herein by reference in their entirety. Generally, such a laser source 200 comprises an oscillator 210, a pulse stretcher 220, an optical amplifier 230, and a grating compressor 240.

The oscillator 210 may comprise a pair of reflective optical elements that form an optical resonator. The oscillator 210 may further include a gain medium disposed in the resonator. This gain medium may be such that optical pulses are generated by the oscillator 210. The gain medium may be optically pumped by a pump source (not shown). In one embodiment, the gain medium comprises doped fiber such as Yb-doped fiber. The reflective optical elements may comprise one or more mirrors or fiber Bragg gratings in some embodiments. The reflective optical elements may be disposed at the ends of the doped fiber. Other types of gain mediums and reflectors as well as other types of configurations may also be used. The oscillator 210 outputs optical pulses having a pulse duration or width (full width half maximum, FWHM), $\tau$, and a repetition rate, $\Gamma$.

The pulse stretcher 220 may comprise an optical fiber having dispersion. The pulse stretcher 220 is optically coupled to the oscillator 210 and disposed to receive the optical pulses output by the oscillator. In certain embodiments, the oscillator 210 and the pulse stretcher 220 are optical fibers butt coupled or spliced together. Other arrangements and other types of pulse stretchers 220 may also be used. The output of the pulse stretcher is a chirped pulse. The pulse stretcher 220 increases the pulse width, $\tau$, stretching the pulse, and also reduces the amplitude of the pulse.

The pulse stretcher 220 is optically coupled to the amplifier 230 such that the amplifier receives the stretched optical pulse. The amplifier 230 comprises a gain medium that amplifies the pulse. The amplifier 230 may comprise a doped fiber such as a Yb-doped fiber is some embodiments. The amplifier 230 may be optically pumped. A same or different optical pump source may be used to pump the oscillator 210 and the amplifier 230. The amplifier 230 may be non-linear and may introduce self-phase modulation. Accordingly, different amplitude optical pulses may experience different amounts of phase delay. Other types of amplifiers and other configurations may be used.

The grating compressor 240 is disposed to receive the amplified optical pulse from the optical amplifier 230. Different types of grating compressors 240 are well known in the art. The grating compressor 240 comprises one or more gratings that introduce dispersion and is configured to provide different optical paths for different wavelengths. The grating compressor 240, which receives a chirped pulse, may be configured to provide for phase delay of longer wavelengths (e.g., temporally in the front of the optical pulse) that is different than the phase delay of the shorter wavelengths (e.g., temporally in the rear of the optical pulse). This phase delay may be such that in the pulse output from the compressor, the longer and short wavelengths overlap temporally and the pulse width is reduced. The optical pulse is thereby compressed.

In one preferred embodiment, the laser source 200 comprises a Yb-doped, amplified fiber laser (e.g., a modified FCPA μJewel, available from IMRA America). Such a laser offers several primary advantages over commercial solid-state laser systems. For example, this laser source provides a variable repetition rate that spans a "unique range" from about 100 kHz to 5 MHz. Additionally, higher pulse energy than oscillator-only systems allows greater flexibility in focal geometry. Higher repetition rate than solid-state regeneratively amplified systems allow greater fabrication speed. The variable repetition rate also facilitates the optimization of the index modification conditions for different mediums, e.g., different glasses etc.

In one embodiment of the laser source 200, the pulse is stretched with a length of conventional step-index single-mode fiber and compressed with the bulk grating compressor 240. The large mismatch in third-order dispersion between the stretcher 220 and compressor 240 is compensated via self-phase modulation in the power amplifier 230 through the use of cubicon pulses. The cubicon pulses have a cubical spectral and temporal shape. Under the influence of self-phase modulation in the power amplifier 230, the triangular pulse shape increases the nonlinear phase delay for the blue spectral components of the pulses while inducing a much smaller nonlinear phase delay for the red spectral components. The degree of this self-phase modulation depends on the intensity of the laser pulse within the power amplifier 230. Moreover, variation in the repetition rate will cause a change in the intensity and, thus, also alter the phase delay and dispersion.

For constant average power, $P_{avg}$, resulting in large part from constant pumping, $P_{avg}=E_{pulse}\times\Gamma$, where $E_{pulse}$ is the pulse energy (J) and $\Gamma$ is the repetition rate (Hz). Thus for constant average power, increasing the repetition rate causes the pulse energy to decrease. Conversely, decreasing the repetition rate causes the pulse energy to increase. Given that the pulse energy changes with repetition rate, e.g., from 3 μJ at 100 kHz to 150 nJ at 5 MHz, the degree of self-phase modulation also changes. The change in self-modulation in the amplifier 230 causes the pulse width to change. To correct for this change in pulse width caused by the variation in repetition rate, the dispersion of the grating compressor 240 can be adjusted.

Figure 3A:
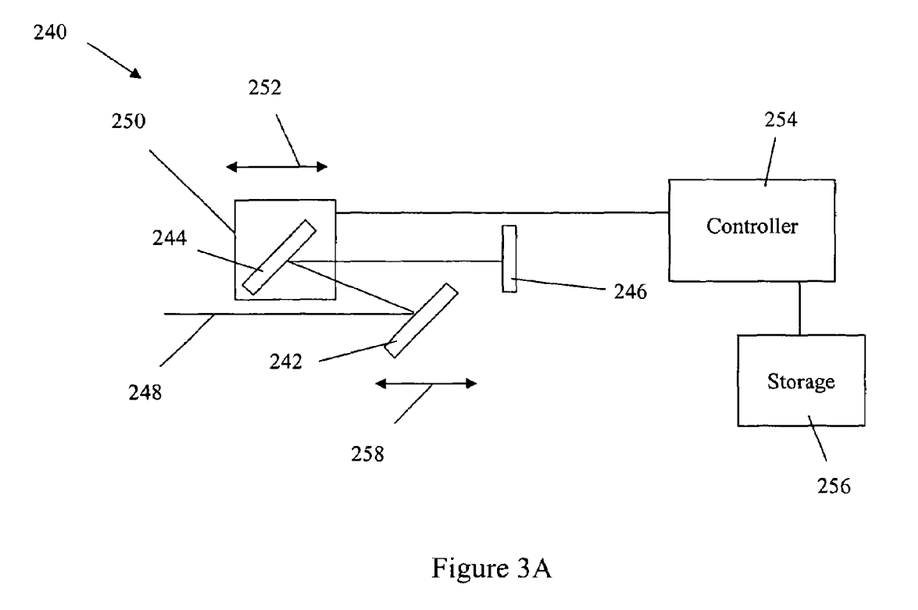
FIG. 3A shows a schematic diagram of one embodiment of the grating compressor that comprises first and second gratings and a mirror.

FIG. 3A schematically illustrates one embodiment of the grating compressor 240 that automatically adjusts the dispersion of the grating compressor with change in repetition rate. The grating compressor 240 includes first and second gratings 242, 244, and a mirror 246. As illustrated, an optical path extends between the first and second gratings 242, 244 and the mirror 246. Accordingly, a beam of light 248 received through an input to the grating compressor 240 is incident on the first grating 242 and diffracted therefrom. The beam 248 is subsequently directed to the second grating 244 and is diffracted therefrom toward the mirror 246. The beam 248 is reflected from the mirror 246 and returns back to the second grating 244 and is diffracted therefrom to the first grating 242. This beam 248 is then diffracted from the first grating 242 back through the input.

FIG. 3A shows the second grating 244 disposed on a translation stage 250 configured to translate the second grating in a direction represented by arrow 252. The translation stage 250 is in communication with a controller 254 that controls the movement of the translation stage. The controller 254 is also in communication with a storage device 256. The controller 254 may comprise a processor, microprocessor, CPU, computer, workstation, personal digital assistant, pocket PC, or other hardware devices. The controller 254 may implement a collection of instructions or processing steps stored in hardware, software, or firmware. The collection of instructions or processing steps may be stored in the controller 254 or in some other device or medium.

The collection of instructions or processing steps may include computer program code elements and/or electronic logic circuits. Various embodiments of the controller 254 include a machine component that renders the logic elements in a form that instructs a digital processing apparatus (e.g., a computer, controller, processor, workstation, laptop, palm top, personal digital assistant, cell phone, kiosk, or the like, etc.) to perform a sequence of function steps. The logic may be embodied by a computer program that is executed by the processor as a series of computer— or control element-executable instructions. These instructions or data usable to generate these instructions may reside, for example, in RAM or on a hard drive or optical drive, or on a disc or the instructions may be stored on magnetic tape, electronic read-only memory, or other, appropriate data storage device or computer accessible medium that may or may not be dynamically changed or updated. Accordingly, these methods and processes may be included, for example, on magnetic discs, optical discs such as compact discs, optical disc drives or other storage device or medium both those well known in the art as well as those yet to be devised. The storage mediums may contain the processing steps which are implemented using hardware. These instructions may be in a format on the storage medium, for example, data compressed, that is subsequently altered.

Additionally, some or all of the processing can be performed all on the same device, on one or more other devices that communicates with the device, or various other combinations. The processor may also be incorporated in a network and portions of the process may be performed by separate devices in the network. Display of information, e.g., a user interface, can be included on the device, or the information can be communicated to the device, and/or communicated with a separate device.

The storage device 256 may comprise one or more local or remote devices such as, for example, disk drives, volatile or nonvolatile memory, optical disks, tapes, or other storage device or medium both those well known in the art as well as those yet to be devised. Communication between the storage device 256 and the controller 254 may be via, e.g., hardwiring or by electromagnetic transmission and may be, e.g., electrical, optical, magnetic, or microwave, etc. Similarly, communication between the controller 254 and the translation stage 252 may be via, e.g., hardwiring or by electromagnetic transmission and may be, e.g., electrical, optical, magnetic, or microwave, etc. A wide variety of configurations and arrangements are possible.

FIG. 3A also shows arrow 258 representing translation of the first grating 242. Either or both of these gratings 242, 244 may be translated using translators connected to the controller 254 or other controllers. Such translation of the first and/or second gratings 242, 244 changes the separation therebetween, which increase or decreases the optical path length traveled by the light between the gratings. Increasing or decreasing this optical path length increases or decreases the effects of the angular dispersion of the gratings on the beam. In certain embodiments, the mirror 246 may also be translated.

In various preferred embodiments, the storage device 256 contains a database that includes values representative of repetition rates and values representative of position or translation amounts for the translation stage 250. When the repetition rate is set or changed, e.g., by a user, the controller 254 may access the storage device 256 and receive therefrom values used to automatically adjust the position of the translator stage 250 and/or the positions of one or both gratings 242, 244.

As described above, in the embodiment of the compressor grating 240 shown in FIG. 3A, translation of the grating 244 as indicated by the arrow 252 alters the optical path distance that diffracted light propagates between the gratings. Changing this optical path length alters the dispersion introduced to the beam 248 by the grating compressor 240. Accordingly, translating the second grating 244 different amounts using the translator 250 alters the dispersion of the grating compressor 240 and may be used to compensate for variation in dispersion of other portions of the laser source 200. In particular, the controller 254 may be configured to automatically induce translation of the second grating 244 via the translator 250 by an appropriate amount in response to a change in the repetition rate so as to counter the change in dispersion in the amplifier 530 that results from the change in the repetition rate.

Different configurations are possible. With reference to FIG. 3A, different combinations of the gratings 242, 244 and the mirror 246 may be translated to automatically adjust the dispersion of the grating compressor 240 by altering the optical path of the beam 248, e.g., between the gratings.

Additionally, the grating compressor 240 may be designed differently. Either of the gratings 242, 244 and the mirror 246 may be excluded. In another embodiment, for example, the grating compressor 240 comprises the first and second gratings 242, 244 without the mirror 246. In other embodiments, more gratings may be used. Additionally, in other embodiments, the grating compressor 240 comprises the first grating 242 and the mirror 246 without the second grating 244. Other designs are also possible. For example, a prism may be used in place of the mirror. The prism may facilitate output of the pumped laser beam 248 from the grating compressor 240 and laser source 200. Still other configurations, both well known in the art as well as those yet to be devised may be used.

Figure 3B:
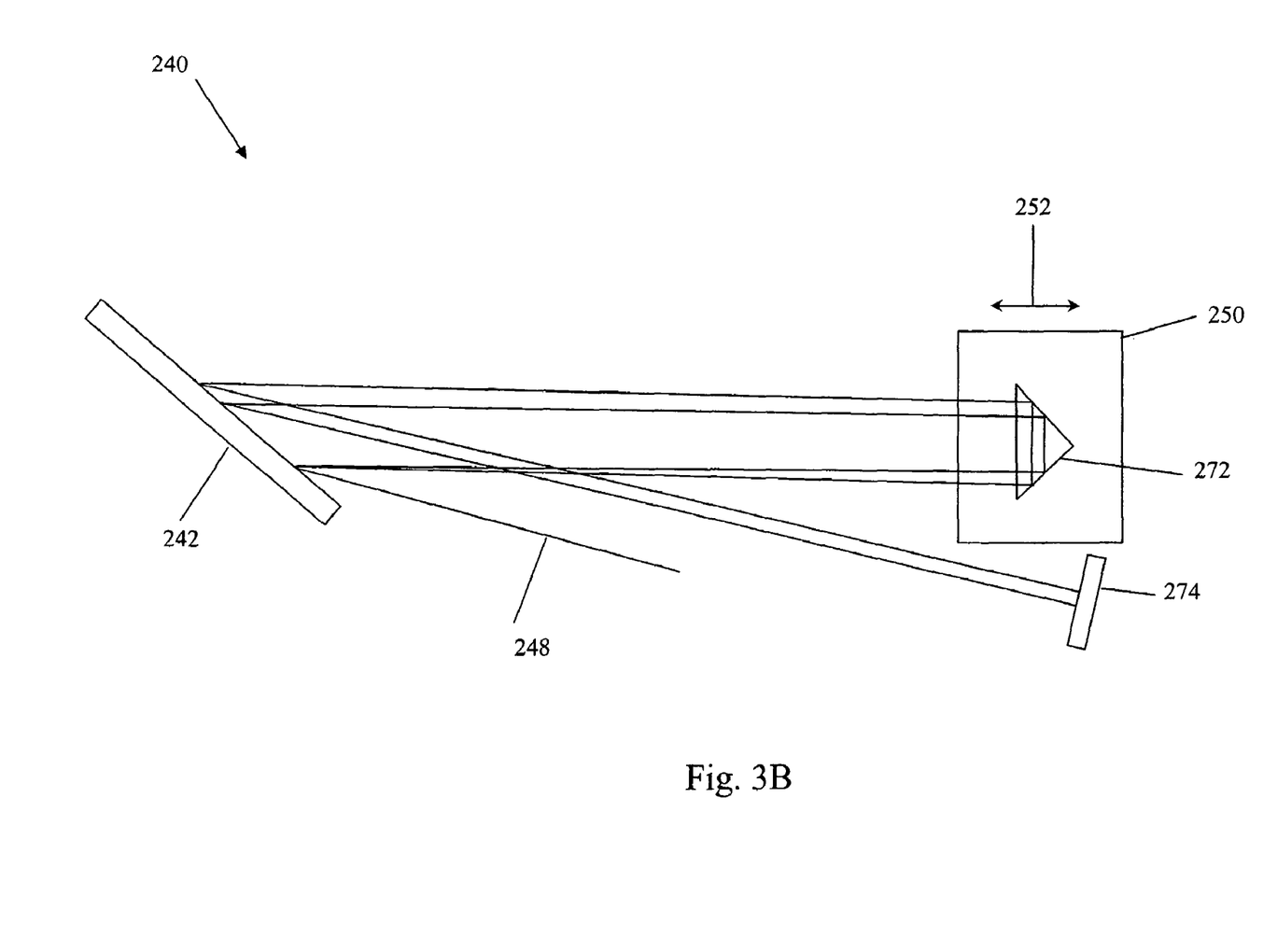
FIG. 3B shows a schematic diagram of one embodiment of the grating compressor that comprises one grating and two retroreflectors.

FIG. 3B illustrates another embodiment of the compressor grating 240 that comprises a grating 242 and first and second retroreflectors 272, 274. The first retroreflector 272 is disposed on a translation stage 250, which is configured to translate the retroreflector 272 in the direction represented by the arrow 252. The translation stage 250 may be configured to operate in a substantially similar manner to that described with reference to FIG. 3A. The incident light beam 248 is received from an input to the grating compressor 240 and travels along an optical path to the grating 242 and is diffracted therefrom. The beam 248 subsequently travels to the first retroreflector 272 and is redirected back toward the grating 242. The beam 248 is diffracted from the grating 242 and travels towards the second retroreflector 274. The beam 248 reflects from the second retroreflector 274 and reverses its path through the grating compressor 240 and back through the input.

The retroreflectors 272, 274 may comprise prisms that in addition to reflecting the beam, provide that the reflected beam is laterally displaced with respect to the incident beam. Accordingly, an input beam can thereby be separated from an output beam. In FIG. 3B, the first retroreflector 272 is oriented to laterally separate the input and output beams in the horizontal direction (in the plane of the paper). The second retroreflector 274 shown in FIG. 3B also comprises a prism; this prism is oriented so as to laterally separate the input and output beams in the vertical direction (out of the plane of the paper). Accordingly, the first and second retroreflectors 272, 274 may comprise substantially identical prisms that are oriented differently (e.g. rotated 90°) with respect to each other. Other types of retroreflectors and other configurations may also be used.

Translation of the first retroreflector 272 as indicated by the arrow 252 alters the optical path distance traveled by the beam 248 between reflections from the grating 242 and thus alters the dispersion introduced to the beam 248 by the compressor grating 240. Accordingly, translating the first retroreflector 272 different amounts using the translator 250 alters the dispersion of the grating compressor 240. Moreover, the first retroreflector 272 may be operably coupled to a controller (not shown but which may be generally similar to the controller 254) that may be configured to automatically induce translation of the first retroreflector 272 by an appropriate amount in response to a change in the repetition rate so as to counter the change in dispersion in the amplifier 530 that results from the change in the repetition rate. Other aspects of the operation of the grating compressor 240 shown in FIG. 3B may be generally similar to those of the grating compressor 240 shown in FIG. 3A. Variations are also possible.

Additionally, instead of using a storage device 256 that contains information relating to the repetition rate upon which the controller 254 uses to automatically adjust the translation stage 250 in the grating compressor 240, the controller may use a different arrangement for determining the appropriate displacement of the translator 250. For example, an optical detector (e.g., a photodiode) may be included that monitors the repetition rate. The controller 254 may use this information from the optical detector. In other embodiments, the optical detector provides a measure of the pulse width and the controller 254 uses this information to automatically adjust the dispersion of the grating compressor 240. Thus, a feedback system that includes the optical detector and the controller 254 may be included to automatically adjust the dispersion of the grating compressor 240. Additional details regard using feedback to control the laser system 200 is disclosed in U.S. patent application Ser. No. 10/813,269 entitled "Femtosecond Laser Processing System with Process Parameters, Controls and Feedback," (IM-110) filed Mar. 31, 2004, which is incorporated herein by reference in its entirety. Other variations in design are possible.

Although the laser source 200 comprising the automatic grating compressor that automatically adjusts for variation in repetition rate may be used in fabricating waveguides as disclosed herein, the laser source is not so limited and may be used for other applications as well.

This laser source 200 may, however, be particularly useful for fabricating waveguide. The combination of high repetition rate and relatively high pulse energy makes possible writing low loss waveguides at high speeds (~1 mm/s) without the need for high NA focal objectives. The ability to use relatively low NA focal objectives simplifies the optical layout and provides long working distance and long depth of focus which are useful for fabrication of three-dimensional structures.

Such systems 10 may also be particularly useful for writing waveguides in fused silica. Fused silica is a relatively difficult glass in which to write waveguides because of its large ionization bandgap (~9 eV). Given a material with ionization bandgap of $\lambda_g$, experiments indicate that writing wavelengths include the region between about 3.0 $\lambda_g$ and 5 $\lambda_g$ in order to produce waveguides with <1 dB/cm propagation loss. While it is possible to write waveguides in fused silica at longer wavelengths, operating near 3.5$\lambda_g$ provides a wider processing window (larger separation between refractive index modification threshold and damage threshold). Furthermore, it is possible to use up to 500 fs pulses when operating near 3.5 $\lambda_g$ in comparison to <150 fs to fabricate low loss waveguides with writing wavelengths $\geq$5 $\lambda_g$. Wavelengths below 3.0 $\lambda_g$ may have reduced effectiveness in waveguide writing and produce less desirable results, such as negative refractive index change. See for example, Streltsov and Borrelli in J. Opt. Soc. Am. B, vol. 19, pp. 2496-2504 (2002), which is incorporated herein by reference in its entirety. Although certain embodiments of the system 10 operate in the wavelength ranges and with the pulse widths described above, other embodiments of the system 10 may utilize different wavelength ranges and pulse widths (e.g., from 100 fs to 1000 fs as well as outside this range).

Waveguide writing with 1 μm wavelength femtosecond laser sources may be accomplished in phosphate and borosilicate glass samples. See R. Osellame et al., Opt. Lett. vol. 29, pp. 1900-1902 (2004) and M. Will et al., in SPIE Proceedings 5339, p. 168 (2004), which are also incorporated herein by reference in their entirety. While the fundamental wavelength of 1 μm is well suited for relatively low band gap transparent materials such as borosilicate, soda-lime, and phosphate glasses, operating at the second harmonic frequency of embodiments of the laser source 200 as described above extends the utility of the laser to include a wider class of high bandgap transparent materials.

Figure 4:
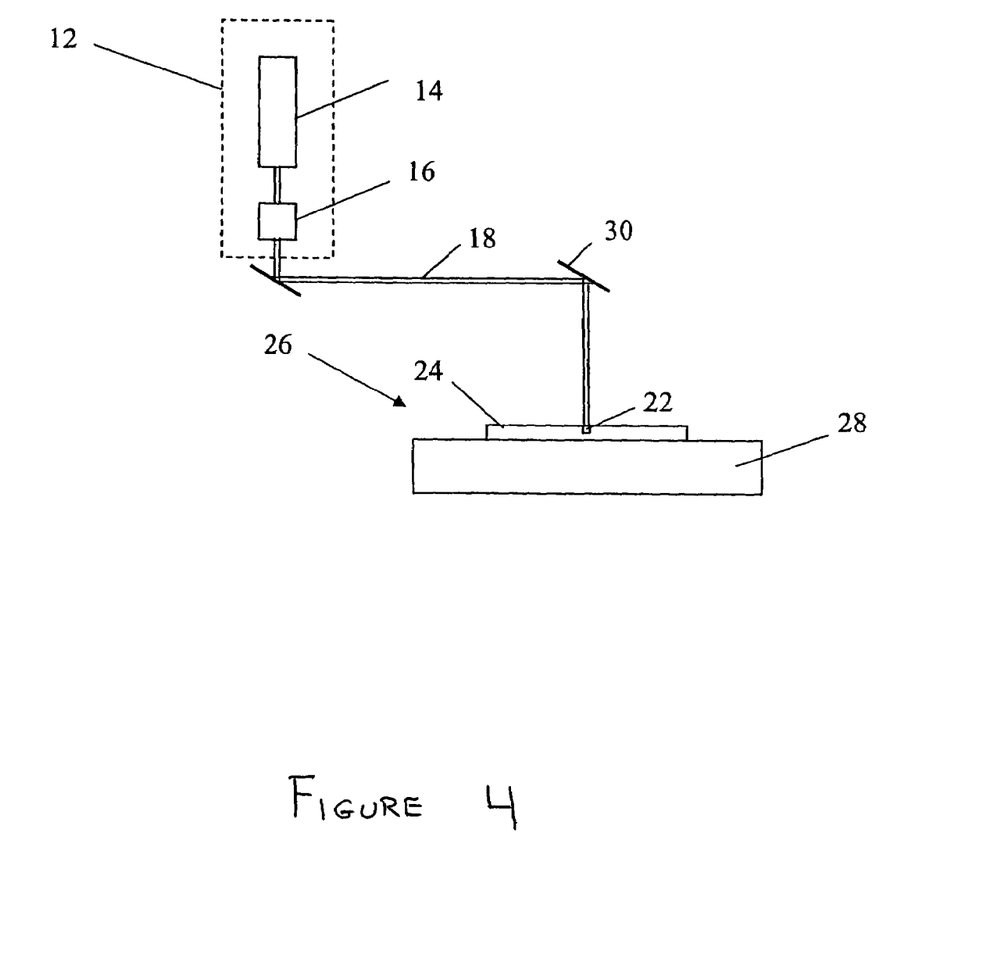
FIG. 4 shows an embodiment of the system for writing a waveguide in which the translation system comprises a rotating or tilting mirror.
Figure 5:
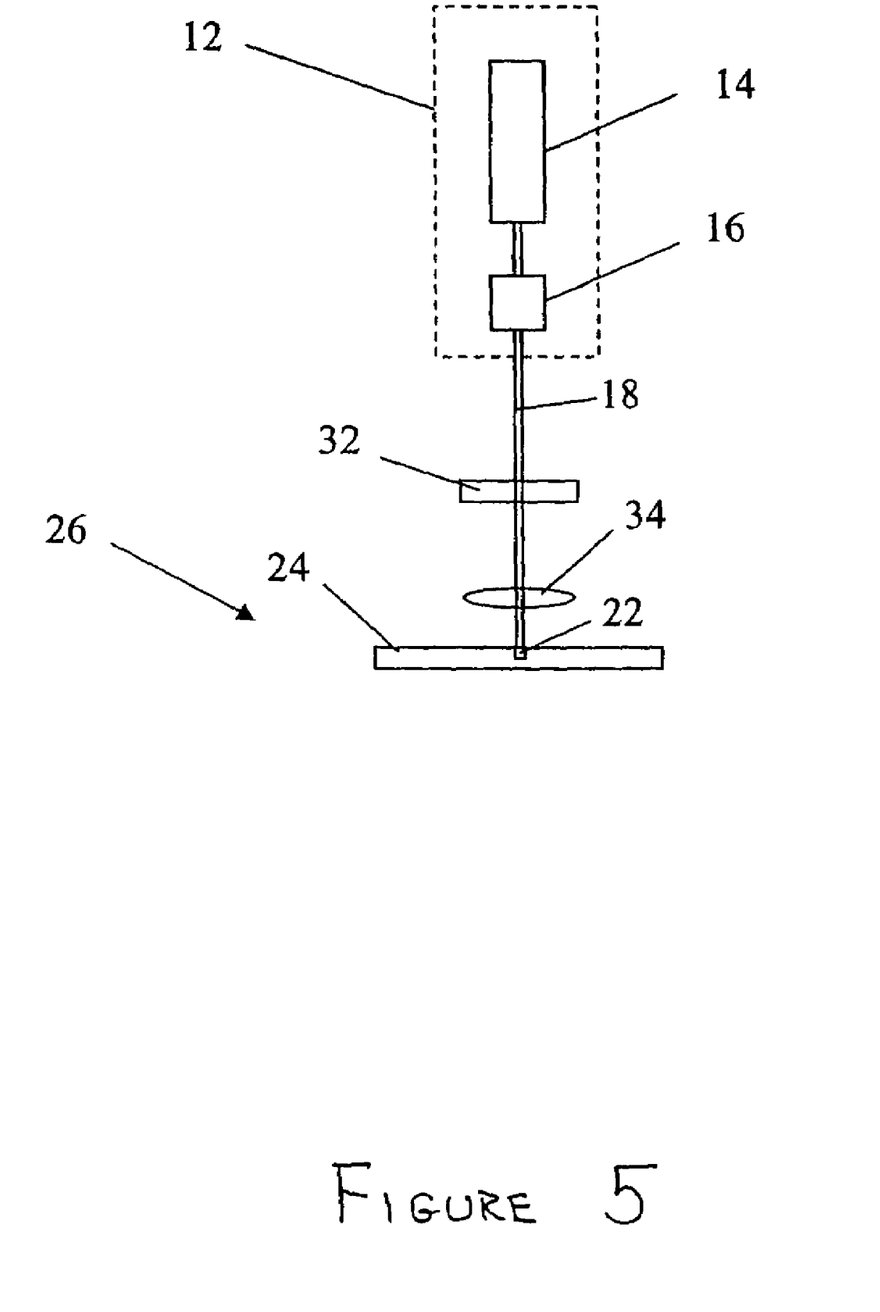
FIG. 5 shows an embodiment of the system for writing a waveguide that uses a mask to form a pattern in or on the medium.

As described above, the configuration of the system may be different and variations in the method of fabricating the waveguide are possible. FIG. 4, for example, shows a system wherein the translation system comprises a rotating or tilting mirror 30. This system 10 does not include focusing optics. The laser beam 18 output from the laser source 12 has sufficiently reduced transverse cross-section. FIG. 5 shows a system for fabricating a waveguide that does not include a translation system. The visible light illuminates a mask 32 that forms a pattern on or in the medium 24 that is illuminated by the visible light. Imaging optics 34 for imaging the mask 32 is also shown. The system 10 may further include illumination optics (not shown) disposed between the laser source 12 and the mask 32 for illuminating the mask with the laser light. In other embodiments, a mask or reticle may be employed in addition to translating or stepping the beam and/or the medium.

In another embodiment, a fiber waveguide may be formed by shining the visible light through the end of a fiber. The visible light alters the index of refraction of the fiber thereby producing a core in the fiber. The core channels visible light further along the fiber to alter the state of the fiber in regions further along the length of the fiber. The core is therefore extended longitudinally along the fiber. Accordingly, the spatial region in the fiber optical medium is self-translated in this example. Other configurations are possible.

Other types of optic elements and structures based on refractive index modification such as gratings, lenses, phase masks, mirrors, etc. may also be fabricate using apparatus and processes similar to those disclosed herein. Other variations are possible.

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A laser source for producing a pulsed laser beam comprising a plurality of ultrashort optical pulses having a variable repetition rate, said laser source comprising:
   a fiber oscillator that outputs optical pulses having an optical pulse width;
   a pulse stretcher disposed to receive said optical pulses, said pulse stretcher having dispersion that increases said optical pulse width yielding stretched optical pulses;
   a fiber amplifier disposed to receive said stretched optical pulses, said fiber optical amplifier having gain so as to amplify said stretched optical pulses;
   an automatically adjustable grating compressor comprising at least one translatable bulk optical element, said compressor having dispersion that reduces the optical pulse width, said dispersion of said grating compressor being adjustable, said grating compressor automatically adjusting said dispersion for different repetition rates, said automatically adjustable grating compressor comprising at least one grating and a reflective element separated by an optical path having an optical path length that is variable so as to adjust the dispersion of said grating compressor: and
   a translation stage that is movable so as to adjust said grating or said reflective element.

2. A laser source for producing a pulsed laser beam comprising a plurality of ultrashort optical pulses having a variable repetition rate, said laser source comprising:
   a fiber oscillator that outputs optical pulses having an optical pulse width;
   a pulse stretcher disposed to receive said optical pulses, said pulse stretcher having dispersion that increases said optical pulse width yielding stretched optical pulses;
   a fiber amplifier disposed to receive said stretched optical pulses, said fiber optical amplifier having gain so as to amplify said stretched optical pulses; and
   an automatically adjustable grating compressor comprising at least one translatable bulk optical element, said compressor having dispersion that reduces the optical pulse width, said dispersion of said grating compressor being adjustable, said grating compressor automatically adjusting said dispersion for different repetition rates,
   wherein said automatically adjustable grating compressor comprises at least two gratings separated by an optical path having an optical path length that is variable so as to adjust the dispersion of said grating compressor.

3. The laser source of claim 2, further comprising a translation stage that is movable so as to translate at least one of said gratings.

4. A laser source for producing a pulsed laser beam comprising a plurality of ultrashort optical pulses having a variable repetition rate, said laser source comprising:
   a fiber oscillator that outputs optical pulses having an optical pulse width;
   a pulse stretcher disposed to receive said optical pulses, said pulse stretcher having dispersion that increases said optical pulse width yielding stretched optical pulses;
   a fiber amplifier disposed to receive said stretched optical pulses, said fiber optical amplifier having gain so as to amplify said stretched optical pulses;
   an automatically adjustable grating compressor comprising at least one translatable bulk optical element, said compressor having dispersion that reduces the optical pulse width, said dispersion of said grating compressor being adjustable. said grating compressor automatically adjusting said dispersion for different repetition rates, and
   a translation stage and a controller, said controller being in communication with said translation stage, said controller configured to send a signal to said translation stage to alter the dispersion of said grating compressor for different repetition rates.

5. A laser source for producing a pulsed laser beam comprising a plurality of ultrashort optical pulses having a variable repetition rate, said laser source comprising:
   a fiber oscillator that outputs optical pulses having an optical pulse width; an automatically adjustable grating compressor comprising at least one translatable bulk optical element, said compressor having dispersion that reduces the optical pulse width, said dispersion being adjustable, said grating compressor automatically adjusting said dispersion for different repetition rates; and
   a storage device containing a database including different repetition rates and associated adjustment values for automatically adjusting said compressor grating based on repetition rate.

6. A laser source for producing a pulsed laser beam comprising a plurality of ultrashort optical pulses having a variable repetition rate, said laser source comprising:
   a fiber oscillator that outputs optical pulses having an optical pulse width; an automatically adjustable grating compressor comprising at least one translatable bulk optical element, said compressor having dispersion that reduces the optical pulse width, said dispersion being adjustable, said grating compressor automatically adjusting said dispersion for different repetition rates; and
   a feedback system that includes an optical detector that senses said optical pulse width and a controller that adjusts said grating compressor based on said optical pulse width.

7. A method of producing a pulsed laser beam comprising a plurality of ultrashort optical pulses having a variable repetition rate, said method comprising:

producing optical pulses having an optical pulse width:
reducing the optical pulse width thereby providing compressed optical pulses: varying the repetition rate:

adjusting dispersion of a bulk grating compressor automatically for said different repetition rates so as to produce the minimum pulse width: and comparing said different repetition rates to repetition rates recorded in a database having adjustment values associated therewith to obtain values for adjusting said dispersion.

8. A laser source for producing a pulsed laser beam comprising a plurality of ultrashort optical pulses having a variable repetition rate, said laser source comprising:

a fiber oscillator that outputs optical pulses having an optical pulse width:

a pulse stretcher disposed to receive said optical pulses, said pulse stretcher having dispersion that increases said optical pulse width yielding stretched optical pulses:

a fiber amplifier disposed to receive said stretched optical pulses, said fiber optical amplifier having gain so as to amplify said stretched optical pulses; and an automatically adjustable grating compressor comprising at least one translatable bulk optical element, said compressor having dispersion that reduces the optical pulse width, said dispersion of said grating compressor being adjustable, said grating compressor automatically adjusting said dispersion for different repetition rates, wherein said fiber amplifier subjects said pulses to levels of self-phase modulation that affects a pulse width of said amplified pulses.

* * * * *

UNITED STATES PATENT AND TRADEMARK OFFICE
CERTIFICATE OF CORRECTION

| | | |
|---|---|---|
| PATENT NO. | : 7,684,450 B2 | |
| APPLICATION NO. | : 11/314197 | |
| DATED | : March 23, 2010 | |
| INVENTOR(S) | : Lawrence Shah | |

It is certified that error appears in the above-identified patent and that said Letters Patent is hereby corrected as shown below:

In column 3 at line 51, change "$5\lambda_g$" to --$5\lambda_g$,--.

In column 3 at line 55, change "500" to --550--.

In column 4 at line 30, change "500" to --550--.

In column 4 at line 51, change "500" to --550--.

In column 5 at line 39, change "500" to --550--.

In column 5 at line 66, change "hannonic" to --harmonic--.

In column 9 at line 51, change "other," to --other--.

In column 10 at line 10, change "electromagnetic" to --electro-magnetic--.

In column 10 at line 13, change "electromagnetic" to --electro-magnetic--.

In column 13 at line 50, in Claim 1, change "compressor:" to --compressor;--.

In column 14 at approximately line 26, in Claim 4, change "adjustable." to --adjustable,--.

In column 15 at line 1, in Claim 7, change "width:" to --width;--.

In column 15 at line 3, in Claim 7, change "pulses:" to --pulses;--.

In column 15 at line 3, in Claim 7, change "rate:" to --rate;--.

In column 15 at approximately line 7, in Claim 7, change "width:" to --width;--.

In column 15 at approximately line 17, in Claim 8, change "width:" to --width;--.

In column 16 at line 3, in Claim 8, change "pulses:" to --pulses;--.

Signed and Sealed this
Sixth Day of December, 2011

David J. Kappos
*Director of the United States Patent and Trademark Office*